Patented Jan. 3, 1933

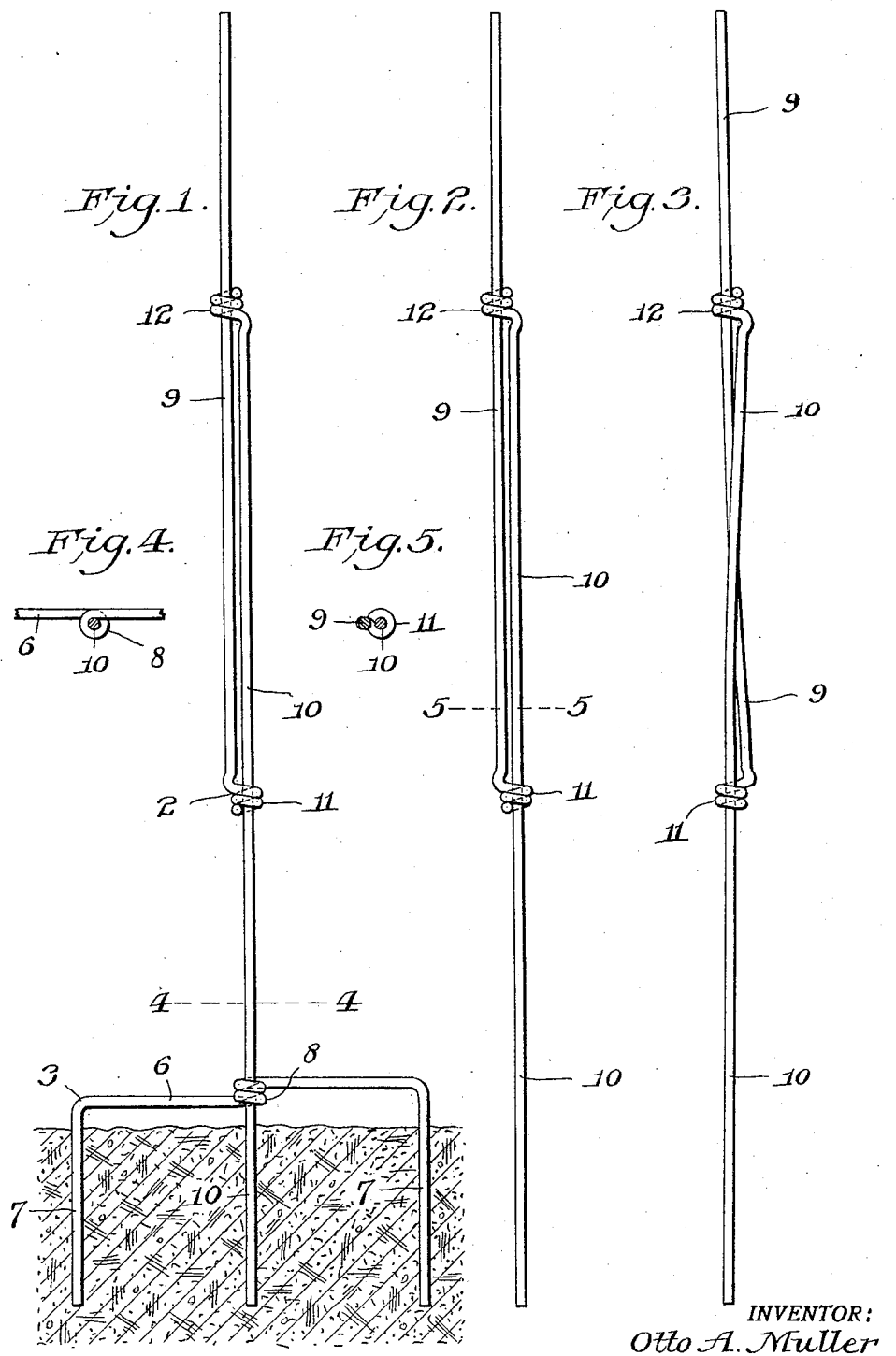

1,893,335

UNITED STATES PATENT OFFICE

OTTO A. MULLER, OF AMBLER, PENNSYLVANIA

PLANT SUPPORT

Application filed August 4, 1930. Serial No. 472,894.

This invention relates to improvements in supports for growing plants.

An object of the invention is to provide a novel and advantageous standard which may be inserted into the soil adjacent to a plant to be supported and which may be adjusted to shorten or to lengthen the same in accordance with the height of the plant, and to which the plant may be tied by means of a string or cord; another object is to provide a novel means for holding the standard in different positions of adjustment; and another object is to provide a novel means for bracing the lower portion of the standard.

With the foregoing and related objects in view, the invention consists of the elements and the combinations of them hereinafter described and claimed.

In the accompanying drawing illustrating the invention,

Figure 1 is a side view of my improved plant support inserted into the ground or soil.

Figure 2 is a side view of the standard removed from the brace.

Figure 3 is a side view of the standard showing the two members thereof twisted to hold them in a position of adjustment.

Figure 4 is a horizontal section of the support, on line 4—4 of Fig. 1.

Figure 5 is a horizontal section of the standard, on line 5—5 of Fig. 2.

Referring to the drawing, 2 designates a standard and 3 a brace therefor.

The brace 3 is formed of a single piece of wire which is bent to form the several parts thereof and it comprises a horizontal portion 6 provided with downwardly extending legs 7 which are adapted to be inserted into the earth or soil. The horizontal portion 6 in the central region thereof, is provided with several bends or helices 8 which surround a vertical axis and form an eye for the reception of the lower end portion of the standard 2.

The standard 2 comprises upper and lower members 9 and 10, respectively, which extend in vertical directions or substantially so, and which are each formed of a single piece of wire.

The lower portion of the upper member 9 laps the upper portion of the lower member 10, as illustrated in the drawing. The lower end portion of the upper member 9 is provided with one or more bends or helices 11 which surround the lower member 10; and the upper end portion of the lower member 10 is provided with one or more bends or helices 12 which surround the upper member 9.

The bends or helices 11 and 12 form eyes through which the members 10 and 9, respectively, are adapted to slide to increase or decrease the length of the lapping portions of the members and thereby shorten or lengthen the standard as a whole, as desired.

When the standard 2 has been adjusted to the desired length the friction between the members 9 and 10 thereof will hold them in their adjusted position; and in addition thereto, after the standard has been adjusted, the lapping portions of the members 9 and 10 may be twisted together slightly by hand, as shown in Fig. 3, which will create sufficient friction between the members to resist great pressure tending to disturb their adjusted relation. After the lapping portions of the members have been twisted as shown in Fig. 3, they may be easily and quickly untwisted by hand when it is desired to change the adjustment thereof.

The wire forming the members 9 and 10 is sufficiently stiff to enable the standard to perform its plant supporting function, and it is sufficiently flexible to permit the members to be twisted for the purpose set forth.

The lower end portion of the lower member 10 of the standard 2 is adapted to slide vertically through the eye 8 of the brace 3; and, when the plant support is inserted into the earth or soil the legs 7 of the brace 3 and also the lower end portion of the standard member 10 are pushed down into the soil a sufficient distance to support the standard in vertical position with the desired stability which may be regulated to a great extent by pushing the standard member 10 through the eye 8 of the brace 3 and into the soil to a greater or less extent as compared to the extent to which the legs 7 of the brace 3 are pushed into the soil.

The brace 3 serves to increase the stability of the standard 2 when the plant support is in service; and in instances where the standard is required to support only a very light load the brace 3 may be dispensed with.

I claim as my invention:

1. A plant support comprising upper and lower substantially straight wire members, the lower portion of the upper member lapping the upper portion of the lower member, the lower end portion of the upper member being bent into the form of an eye surrounding and slidably fitted to the lower member, the upper end portion of the lower member being bent into the form of an eye surrounding and slidably fitted to the upper member, said members having sufficient stiffness to support a growing plant and said members having sufficient flexibility to permit them to be twisted together between said eyes, and to be retained in twisted condition by frictional contact with each other.

2. A plant support comprising a standard and a brace therefor, the brace being constructed of a single piece of wire and comprising a horizontal portion having the central portion thereof bent into a helix forming a vertically extending eye, and leg portions extending downwardly at the respective ends of the horizontal portion substantially parallel to the axis of said eye for insertion into the soil, and the standard rising from the brace and having its lower end portion located within and slidable through said eye for insertion into the soil between said legs.

In testimony whereof I affix my signature.

OTTO A. MULLER.